United States Patent [19]
Oestreich et al.

[11] Patent Number: 5,163,116
[45] Date of Patent: Nov. 10, 1992

[54] OPTICAL CABLE WITH AT LEAST ONE OPTICAL WAVEGUIDE

[75] Inventors: Ulrich Oestreich, Munich; Guenter Zeidler, Germering; Juergen Barfuss, Munich; Heinz Glaser, Germering, all of Fed. Rep. of Germany

[73] Assignee: Siemens Aktiengesellschaft, Munich, Fed. Rep. of Germany

[21] Appl. No.: 793,363
[22] PCT Filed: Jun. 22, 1990
[86] PCT No.: PCT/DE90/00477
  § 371 Date: Dec. 20, 1991
  § 102(e) Date: Dec. 20, 1991
[87] PCT Pub. No.: WO91/00536
  PCT Pub. Date: Jan. 10, 1991

[30] Foreign Application Priority Data
  Jun. 28, 1989 [DE] Fed. Rep. of Germany ....... 3921184
  Sep. 27, 1989 [DE] Fed. Rep. of Germany ....... 3932251

[51] Int. Cl.[5] .......................... G02B 6/00; G02B 6/44
[52] U.S. Cl. .................................................... 385/111
[58] Field of Search ........................ 385/100, 109, 111

[56] References Cited

U.S. PATENT DOCUMENTS 4,832,433  5/1989  Chapelle et al. ................ 385/31 X

FOREIGN PATENT DOCUMENTS 0165632  12/1985  European Pat. Off. .
2459997   6/1976  Fed. Rep. of Germany .
3027743   2/1982  Fed. Rep. of Germany .

*Primary Examiner*—Akm E. Ullah
*Attorney, Agent, or Firm*—Hill, Van Santen, Steadman & Simpson

[57] ABSTRACT

The optical waveguide (AD) has a substantially rectangular internal opening in the form of a chamber (CA) for accepting the optical fibers arranged in the form of ribbon conductors (BL1-BLn). The optical fibers (AD) (sic) has a preferred bending plane (BP), the ribbon conductors being arranged with their broad sides substantially parallel to this preferred bending plane (BP), and the ribbon conductors (BL1-BLn) being guided in an undulating fashion such that their excursion extends transverse to the preferred bending plane.

14 Claims, 2 Drawing Sheets

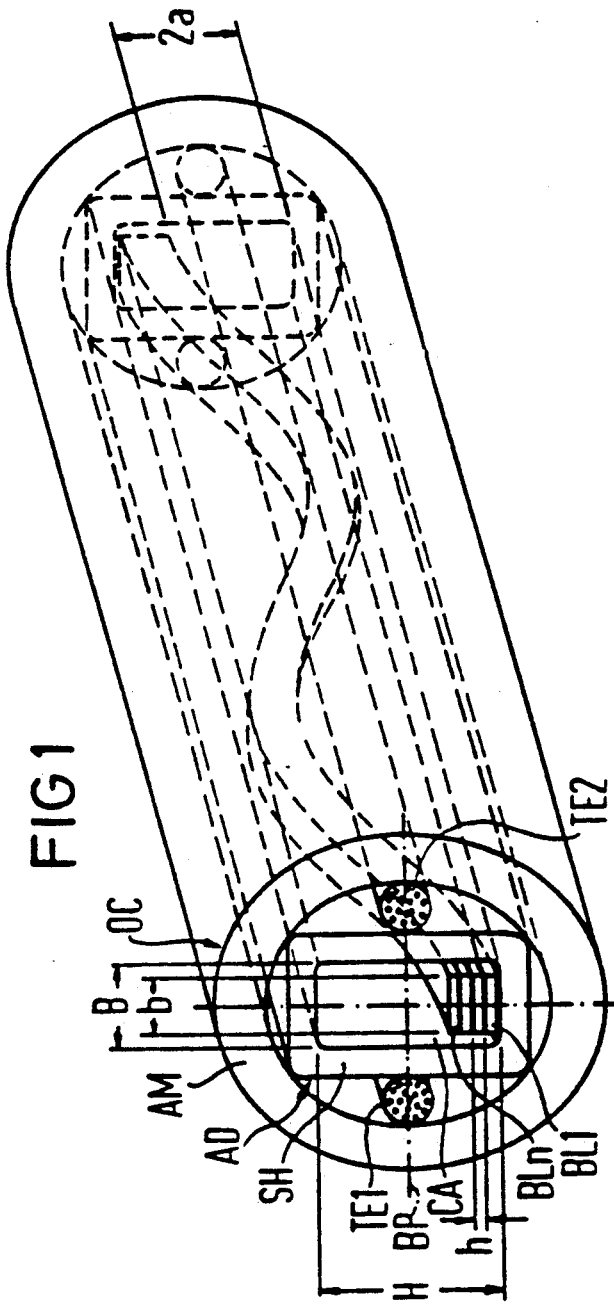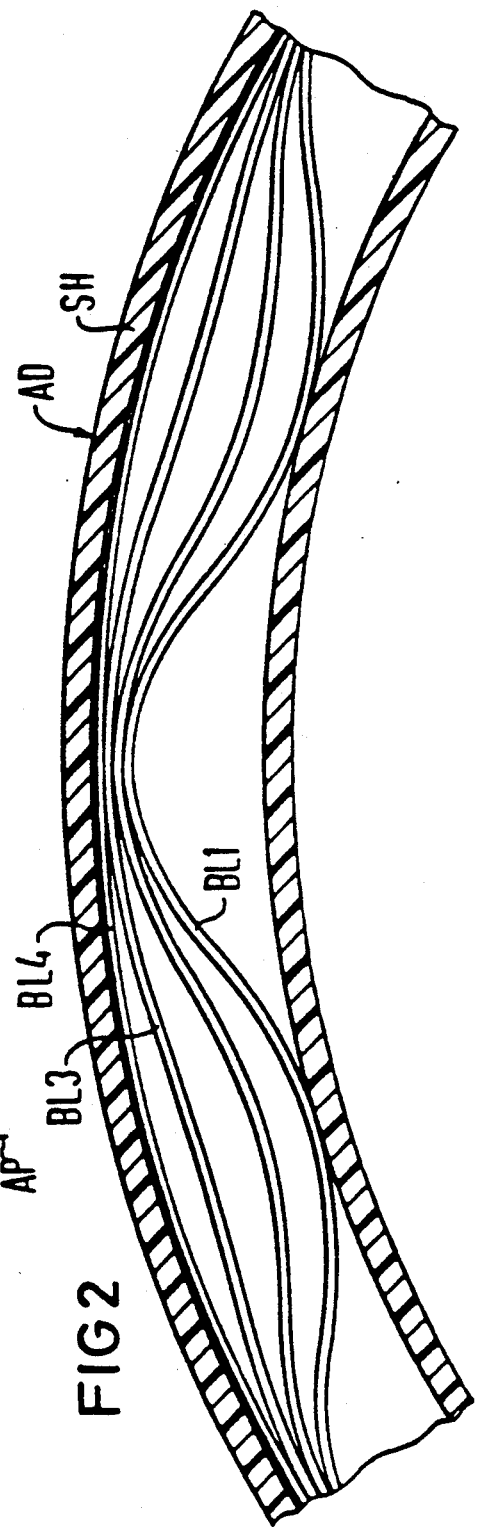

OPTICAL CABLE WITH AT LEAST ONE OPTICAL WAVEGUIDE

BACKGROUND OF THE INVENTION

1. Field of the Invention

The invention relates to an optical waveguide for an optical cable with at least one optical waveguide which has a protective covering and a substantially rectangular internal opening which forms a chamber for accepting the optical fibers, in each case a number of ribbon conductors each having a plurality of optical fibers being accommodated in the chamber in the form of a ribbon conductor stack, and the optical waveguides having a bending plane with the smallest bending resistance and the ribbon conductors being arranged with their broad sides substantially parallel to this bending plane.

2. Description of the Related Art

GB-A 30,157,516 discloses an optical cable in which a circular opening which serves to accept a subunit provided with tension elements is provided inside a cable sheath. This subunit has a substantially approximately rectangular cross section and represents a flat, ribbon-shaped configuration. Provided in the interior is an opening in which two optical fiber ribbons are arranged between which only a very small spacing exists. In order to produce an excess length, the subunit is guided as a whole through an undulation device, so that after this production process the subunit has assumed an undulating structure. A space which corresponds to at least the excursion of the undulation is required in order to accommodate such an undulating structure. In addition, the undulation requires its own undulation process to be carried out, it being impossible for this undulation process to be carried out without a certain mechanical loading of the optical fiber ribbons.

DE-U 89 01 404 discloses an optical cable in which a ribbon conductor stack is accommodated in a tubular protective covering. This protective covering has a circular cross section. In order to guarantee the cohesion of the optical fiber ribbons inside the stack, firmly adhering connecting elements which fix the ribbon conductor stack are provided at specific spacings. However, such additional connecting elements represent not only an additional outlay, but they also cause a lower displaceability of the optical fiber ribbons inside the stack. Moreover, the connecting elements always also entail a mechanical loading of the ribbons.

An optical waveguide of this type is disclosed in German Offenlegungsschrift 30 27 743, the excess length of the optical fiber with respect to the protective covering of the optical waveguide being achieved when the optical fiber or fibers are inserted by being fed. In this way, the optical fibers acquire an approximately undulating shape, an additionally inserted gel-like filler stabilizing the optical fibers in this undulating structure.

However, in many instances it is desirable not to arrange individual optical fibers inside a protective covering, but to guide these in the form of ribbon conductors, which in particular substantially simplifies splicing technology. It is known from DE-A 24 59 997 to arrange a plurality of optical fibers adjacent to one another and to fix the latter at discrete points on a carrier sheet, for example of plastic material. The carrier sheet itself therefore does not extend in a straight line. Since the optical fibers extend freely outside these fastenings, it is possible to realize an undulating structure for them in these regions. However, it is to be borne in mind in this regard that fixing optical fibers at specific points is always accompanied by a certain mechanical loading in this region. The procedure in constructing a cable is such that a plurality of tensile elements, for example in the form of steel wires, are provided in a flat cable sheath, one or more ribbon conductors being arranged inside rectangular openings. The rectangular openings themselves are chosen such that the width of a ribbon conductor corresponds to the largest transverse extension of the opening.

EP-A2 0 165 632 describes an optical transmission element in which a stack of a plurality of ribbon conductors is mounted inside a tubular protective covering. In order to achieve a uniform loading of the optical fibers, this stack is inherently twisted, which requires a considerable outlay in terms of production and leads in any case to tensile, compressive and torsional stresses in the fibers. The excess length that can be produced in this way is extremely small, and the position of the ribbons in the cable itself becomes all the less defined the fewer ribbon conductors there are accommodated in the cable core.

SUMMARY OF THE INVENTION

It is the object of the present invention to disclose a way which facilitates accommodating ribbon conductors with optical fibers in a considerate fashion inside a protective covering, and permits the provision of an appropriate excess length in a simple manner. According to the invention, this object is achieved in an optical waveguide of the type mentioned at the beginning when the ribbon conductor stack with its ribbon conductors is guided in an undulatingly curved fashion in the chamber such that the excursion of the ribbon conductor stack extends transverse to the bending plane with the smallest bending resistance; when the height of the chamber is dimensioned such that the stretching of the outermost ribbon conductor following from the smallest possible drum radius and the compression of the innermost ribbon conductor proceed without an impermissibly high mechanical loading of the ribbon conductors; when owing to the undulating guidance of the ribbon conductor stack the latter forms a type of strip spring structure; and when the ribbon conductors laterally comprise a certain play with respect to the chamber wall such that turning up or down or cross-positioning of the ribbon conductors is prevented.

The substantially rectangular internal opening of the optical waveguide facilitates a defined guidance of the ribbon conductors. Owing to the fact that the optical waveguide has a preferred bending plane, the ribbon conductors being arranged with their broad sides substantially parallel to this preferred bending plane, that is to say the bending plane having the smallest bending resistance, it is achieved that the bending loading, for example during laying of a cable, on the individual ribbon conductors can be held low. It is also avoided in the case of the invention that an undesired mechanical loading of one of the ribbon conductors of the ribbon conductor stack occurs in the case of the smallest permissible drum radius. Owing to the undulating guidance of the ribbon conductors, the excess length is guaranteed, on the one hand, while it is also ensured, on the other hand, that although they are arranged loosely (elastically) inside the chamber, the ribbon conductors are at the same time held in their position in a defined fashion, that is to say no turning up or down or cross positioning of the individual ribbon conductors is permitted. The ribbon conductors themselves form a sort of "strip spring structure", which is held elastically in the interior of the chamber and combines the greatest possible mobility with a simultaneously defined position.

Developments of the invention include the total height of the ribbon conductor stack that extends in an undulating fashion amounting to less than 50% of the height of the chamber and the width of the ribbon conductors amounting to between 60% and 90% of the width of the chamber.

Preferably, the ribbon conductor that lies on the outer run of the stack of ribbon conductors is not stretched and not under tension during winding of the cable on a reel or drum. In an exemplary embodiment, the range of the most pronounced radius of curvature of the ribbon conductor lying on the inner run during winding does not drop below 60 mm. It is desired that the ratio of the height to the width of the chamber is between 2:1 and 4:1.

The periodic length of the undulatingly curved ribbon conductor stack is, for example, between 40 and 80 mm, and preferably about 60 mm. The cable itself preferably already is an optical waveguide.

Given the use of protective coverings with rectangular external cross sections, a plurality of optical waveguides are arranged with their broad sides next to one another and the cable core thus formed is surrounded by an outer sheath.

One embodiment finds the optical waveguides arranged displaceably with respect to one another. As yet another development, tensile elements are arranged in the preferred bending plane or symmetrically with respect to the latter. Tensile elements bear in each case against the outer broad sides of the optical waveguides.

BRIEF DESCRIPTION OF THE DRAWINGS

The invention and its developments are explained in more detail below with reference to the drawings, wherein:

FIG. 1 shows a perspective representation of an optical cable with an optical waveguide according to the invention, and FIG. 2 shows the position of the ribbon conductors of a stack during the flexing process.

DETAILED DESCRIPTION OF THE PREFERRED EMBODIMENTS

Figure 3:
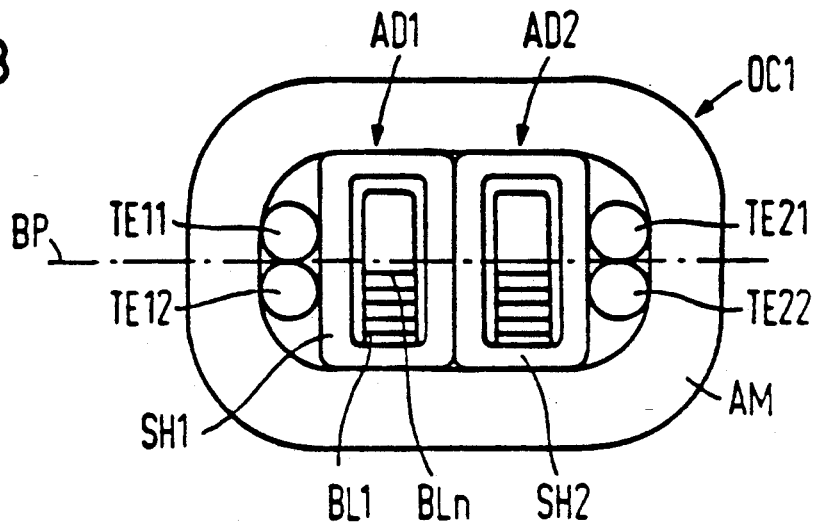
FIG. 3 shows a first exemplary embodiment of a cable according to the invention with two optical waveguides.

The optical cable OC has an outer sheath AM in the interior of which there is arranged an optical waveguide AD whose longitudinal axis coincides with the cable axis. The optical waveguide AD has a protective covering SH with a rectangular cross section, there being formed in the interior a chamber CA which likewise has a rectangular cross section. The rectangular shape of the chamber CA corresponds to the rectangular shape of the external contour, that is to say both rectangular shapes are approximately similar and the chamber dimensions correspond to the external dimensions after subtracting twice the (approximately constant) wall thickness. If the ribbon conductors are to be flexible about the light, or minor, axis BP and have a useful excess length, which is not to be so very greatly influenced by the bending, the chamber CA must be bent with its edge uppermost, which is easy to carry out given the use of plastic for the protective covering SH.

The preferred bending plane ("neutral plane") lies in a plane BP, which coincides with the short axis of the optical waveguide AD and which thus extends transverse to the long axis AB of the rectangular optical waveguide AD. In order to create defined relationships with regard to this bending plane BP, elements which are strong in tension and strong in compression are additionally arranged there, for example in the form of steel wires which are designated in the present example by TE1 and TE2. It is also possible to arrange more than one steel wire on each side, their positioning always being performed, however, symmetrically with respect to the bending plane BP. Mounted in the interior of the chamber CA are n ribbon conductors BL1-BLn, to be precise such that they extend, as represented, with their broad sides parallel to the bending plane BP. If the width of the chamber opening is designated by B, it is then expedient to chose the length of the broad side b of the optical fiber ribbons BL1-BLn in a range for which it holds that:

$$b = 0.6\ B\ \text{to}\ 0.9\ B.$$

Thus, the ribbon conductors should be accommodated laterally with a certain play and thus somewhat freely movable, but must be accommodated so that turning up or down or tilting about their longitudinal axis is avoided.

In order to ensure this defined position of the ribbon conductors inside the chamber CA, to prevent turning up or down and nevertheless to obtain mobility for the ribbon conductors, the ribbon conductors are guided, as represented by dashes, in an undulating shape (to be precise, preferably in the shape of a sinusoidal line). This undulating guidance is performed such that in each case the wave crest adjoins the upper end (narrow side) of the rectangular chamber CA while the wave trough touches the lower end (narrow side) of the chamber CA. As a result, the ribbon conductors are situated in the form of a strip spring in a defined position inside the rectangular cross section, have a sufficient excess length and are protected against turning up or down.

The relationship $$H = n \cdot h + 2a + X$$

holds with reference to the height H of the chamber CA. Here, $2a$ is the distance between a minimum and a maximum of the undulating shape of a ribbon conductor, for example BL1, h is the thickness of a ribbon conductor and n is the number of the ribbon conductors which are provided as a stack in the interior. X is an additional term resulting from the fact that the cable must be wound onto a minimum radius and that the thickness of the ribbon stack (compare FIG. 2) leads to a drawing out of the waves of the outermost ribbon conductors BL4, but to an enlargement of the waves of the innermost ribbon conductors BL1. The bending plane BP and the ribbons BL1 to BL4 (that is to say n=4) are perpendicular to the plane of the drawing in FIG. 2. Taking into account that the outermost and the innermost ribbon conductor BL1 and BL4 are each raised by at most 1 mm out of the middle bending plane, and that the smallest possible excess length is $2 \cdot 10^{-3}$, not more than $2 \cdot 10^{-3}$ can be removed from the most strongly stretched ribbon conductor BL4, which the most strongly compressed ribbon conductor BL1 has $2 \cdot 10^{-3}$ more to accommodate, which corresponds to an approximately 0.3 mm increase in amplitude, and to an approximately 0.5 mm increase in chamber height.

$$\frac{\Delta l}{l} \approx \frac{a^2 \times \pi^2}{p^2}$$

For an excess length $2 \cdot 10^{-3}$ (stretched) a minimum drum radius of $1/(2 \cdot 10^{-3}) = 500$ mm is thus permissible, and for $4 \cdot 10^{-3}$, 250 mm is permissible, the height of the chamber having to be $2 \times 0.85 + 6 \times 0.3 + 0.6 = 4.1$ mm in the first case, and $2 \times 1.25 + 6 \times 0.3 + 0.6 = 4.9$ mm in the second case. For six 0.3 mm thick ribbon conductors BL1-BLn and amplitudes a, the chamber height H moves by 0.85 to 1.25 mm, that is to say by 4.5 mm, and the chamber width B by 1.6 mm. The normal (minimum) drum radius for a cable of 10 mm diameter could well be approximately 300 to 400 mm, so that a built in excess length of $3 \cdot 10^{-3}$ to $4 \cdot 10^{-3}$ is required. The whole yields an upper height n h of the ribbon conductor stack of approximately 1.5 to 1.8 mm, that is to say, for example, 5 to 6 ribbon conductors at 0.3 mm thickness.

It is possible to seal the interstices outside the optical waveguide AD up to the internal wall of the outer sheath AM with a filler, in order to keep the cable longitudinally watertight.

It is likewise possible to fill the remaining interior space of the chamber CA with a very soft (preferably thixotropic) filler.

The method of producing such a cable is as follows:

The undulations of the ribbon conductors are advantageously produced by thermal contraction of the jacket of the ribbon conductor. The calibration is undertaken from outside, without significantly altering the volume of the waveguide AD. It is also possible to guide a plurality of waveguides AD in the cable core, namely parallel to one another, the specifications previously explained holding for each waveguide.

As an example, the following specifications can advantageously be adopted to construct an optical cable OC:

| | | |
|---|---|---|
| (4) fibers in BL1-BLn) | B | 1.4 to 1.6 mm |
| (8) fibers in BL1-BLn) | B | 2.6 to 3.0 mm |
| (4) fibers in BL1-BLn) | b | approx. 1.1 mm |
| (8) fibers in BL1-BLn) | b | approx. 2.5 mm |
| | n | 1 to 6 |
| Wall thickness of | SH | 0.6 to 1.2 mm |
| | a | 0.5 to 1.5 mm |
| | h | 0.25 to 0.35 mm |
| | H | 4 to 6 mm |

As an example, the following specifications advantageously hold for the dimensioning of the sinusoidal wave:

The relationship $$\frac{\Delta l}{l} \approx \frac{a^2 \cdot \pi^2}{p^2} \quad (1)$$

holds for the sinusoidal wave, and the relationship $$\rho = \frac{p^2}{4a \cdot \pi^2} \quad (2)$$

holds for the critical radius of curvature $\rho$ at the apex, resulting in $$a = 4 \cdot \rho \cdot \frac{\Delta l}{l} \quad (3)$$

upon choosing this radius of curvature and the desired excess length.

$$\rho = 60 \text{ mm}, \frac{\Delta l}{l} = 6 \times 10^{-3}$$

For the extreme values $\rho = 60$ mm and $\Delta l/l = 6 \cdot 10^{-3}$ (in the flexed wound on state of the cable), an amplitude of 1.5 mm (in conjunction with a periodic length P = 60 mm) is obtained, so that the (filled) chamber acquires a height H of 3.0 mm + 1.8 = 4.8 and a width B of 1.6 mm for 4-fiber ribbons, or 3 mm for 8-fiber ribbons.

The critical state of the cable is actually neither that under tension nor that under contraction, but under flexure on the drum, because here the contraction of the innermost ribbon conductor is the most pronounced and unavoidable. Normal flexures on the segment can take place under a virtually arbitrarily small radius, since stretched pieces are available on both sides for length compensation. The innermost ribbon conductor slides most strongly to both sides.

If the chamber height H is to be small, the drum core must become larger.

Forced flexures of the cable in the heavy (false) plane AP are avoided because the cable then rotates by approximately 90° over a longer segment, that is to say is correspondingly deflected and then once again "correctly" adjusted, to be precise chiefly through the influence of the support elements TE1 and TE2. An improvement during winding can be achieved by winding the cable OC twisted alternately left and right.

Taking account of the explanations with regard to FIG. 2, it is expedient to proceed as follows when dimensioning the ribbon stack with regard to the smallest radius of curvature of the cable drum onto which the optical cable OC is to be wound: In the wound state, the ribbon conductor BL4 lying on the outer run should advantageously precisely not yet have been stretched, or at least not under tension, so that during the winding process itself this ribbon conductor still has a certain small excess length, or at least is not subjected to continuous tensile stress.

It is expedient to set as a limit for the more strongly compressed lower ribbon conductor BL1 that in the wound state its radius of curvature in the region of the greatest curvature should not drop below 60 mm.

It is expedient to observe values of H:B of 2:1 to 4:1 for the ratio of the height H of the chamber to the width B of the chamber.

The periodic length P of the undulatingly curved ribbon conductor stack should be chosen between 40 and 80 mm, it being preferable for values around 60 mm to be applicable.

When calculating the height of the chamber ($H = n \cdot h + 2a + X$), the additional term X should preferably be chosen between 0.4 and 0.8 mm. It is also possible to form the cable itself by means of the optical waveguide AD, that is to say an outer sheath AM is not required.

Accommodating ribbon conductors in a considerate fashion inside a protective covering can be facilitated by means of a cable constructed according to the invention, it being possible to provide the desired excess length in a simple manner. The substantially rectangular internal opening of the optical waveguide facilitates a defined guidance of the ribbon conductors. Owing to the fact that the ribbon conductor are arranged with their broad sides substantially parallel to the preferred bending plane, the flexural loading of the individual ribbon conductors can be held low. Owing to the undulating guidance of the ribbon conductors, the necessary excess length is guaranteed, on the one hand, while it is also ensured, on the other hand, that although they are arranged loosely (elastically) inside the chamber, the ribbon conductors are at the same time held in their position in a defined fashion. It is thus impossible for there to be any turning up or down or cross-positioning of the individual ribbon conductors. The individual ribbon conductors form a sort of "strip spring structure", which is held elastically in the interior of the chamber and combines the greatest possible mobility with a simultaneously defined position.

Since the external dimensions of such an optical waveguide cannot be rendered arbitrarily large, difficulties arise when a relatively large number of optical fibers are to be accommodated inside a cable.

Furthermore, it is the object of the present invention to disclose a way in which an optical cable can be constructed such that in conjunction with good mechanical properties and accommodating the optical fibers in a considerate fashion it is also possible to accommodate a relatively large number of the optical fibers inside the cable.

According to a development of the invention, this object is achieved in the case of an optical cable of the type mentioned at the beginning when a plurality of optical waveguides are arranged with their broad sides next to one another and the cable core thus formed is surrounded by an outer sheath.

Since the optical waveguides are arranged with their broad sides next to one another, the position of all the ribbon conductors with reference to the preferred bending plane remains preserved exactly as in the case of only a single optical waveguide. Moreover, constructing a cable core is particularly simple because it is possible to produce stock and assemble it to form the cable core. It is advantageous in this regard when the individual optical fiber waveguides although lying with their broad sides next to one another are arranged displaceably with respect to one another.

Represented in FIG. 3 is the end face of an optical cable OC1, of which the cable core consists of two optical waveguides AD1 and AD2. These optical waveguides have a rectangular cross section and lie with their broad sides movably next to one another. Mounted in each case in the interior of these optical waveguides AD1 and AD2 is a ribbon conductor stack of n ribbon conductors, which are denoted by BL1 and BLn. Each of these ribbon conductors obtains a number of m, for example 2-6, optical fibers. The ribbon conductors BL1-BLn are arranged movably inside the rectangular internal opening of the protective covering SH1 or SH2 of the waveguides AD1, AD2. Moreover, each stack of ribbon conductors BL1-BLn is guided in an undulating fashion seen in the longitudinal direction of the cable, so that turning up or down or tilting of the ribbon conductors is avoided and a certain excess length is simultaneously provided. Arranged in the preferred bending plane BP or symmetrical with respect thereto are tensile elements, for example in the form of steel wires, which are denoted in the present example by TE11 and TE22. They bear directly against the respective outer broad side of the waveguides AD1 and AD2. An outer sheath AM of extruded or shrunk on material holds the entire arrangement together, both the optical waveguides AD1 and AD2 and the tensile elements TE11-TE22 being arranged movably with their respective groups and with respect to one another. This produces particular advantages during the flexing process, because corresponding compensation processes can be carried out more easily. Assuming that six ribbon conductors are provided in each case (that is to say $n=6$), and that each of these ribbon conductors comprises four optical fibers in each case, the result is the following dimensions, for example:

| | |
|---|---|
| Inside diameter of waveguides AD1 & AD2: | $1.6 \times 4.0$ mm |
| External dimensions of waveguides AD1, AD2: | $3.2 \times 5.6$ mm |
| Fiber excess length: | $4 \cdot 10^{-3}$ |
| Total number of optical fibers: | 48 |

Figure 4:
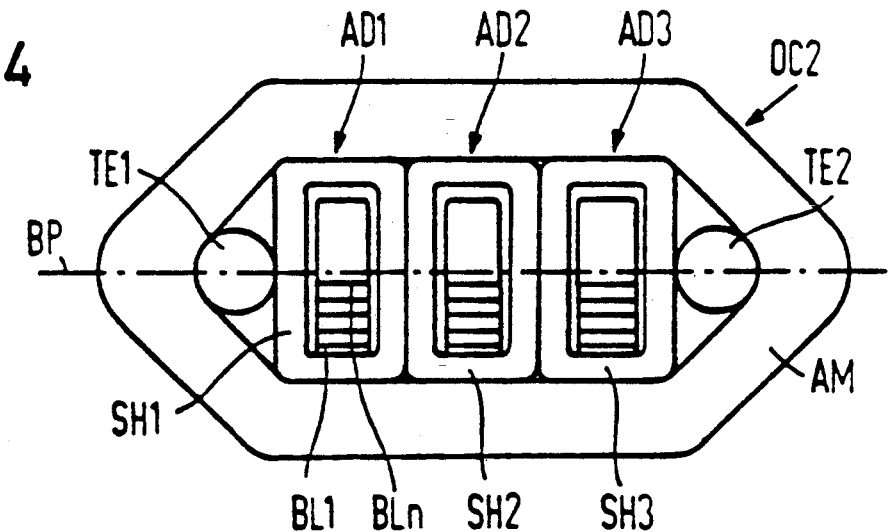
FIG. 4 shows a second exemplary embodiment of a cable according to the invention with three optical waveguides.

In the exemplary embodiment according to FIG. 4, where three optical waveguides AD1-AD3 are provided, it is possible to accommodate a total of 72 optical fibers in a cable OC2 on the basis of the numerical values previously quoted.

In both cases, the outer sheath AM is chosen approximately in the order of magnitude of 2 mm (sic) wall thickness, so that the cable according to FIG. 4 approximately has dimensions in the order of magnitude of 17.6 mm×9.6 mm, and can thus easily be drawn into each cable duct and can be loaded in the normal way. Flexure is preferably performed in only one plane, to be precise in the plane BP, that is to say the tensile elements TE1 and TE2 or TE11 to TE22 are in or symmetrical with respect to the bending plane BP. Since the cable adjusts to line curvatures under moderate torsion, the ability to be drawn in is only slightly hindered. The advantage of the cable according to the invention resides in the combination of ribbon structure in the optical fibers, easy possibility of branching and subdivision, and clear (that is to say defined) fiber excess length.

Although other modifications and changes may be suggested by those skilled in the art, it is the intention of the inventors to embody within the patent warranted hereon all changes and modifications as reasonably and properly come within the scope of their contribution to the art.

I claim

1. An optical cable, comprising: at least one optical waveguide a protective covering over said at least one optical waveguide and a substantially rectangular internal opening in said protective covering which forms a chamber for accepting optical fibers, a number of ribbon conductors each having a plurality of optical fibers, said ribbon conductors being accommodated in the chamber arranged as a ribbon conductor stack, and the optical waveguide having a bending plane with a smallest bending resistance and the ribbon conductors being arranged with their broad sides substantially parallel to said bending plane, the ribbon conductor stack being guided in an undulatingly curved fashion in the chamber such that an excursion of the ribbon conductor stack extends transverse to the bending plane with the smallest bending resistance, the chamber being of a height of such dimension that an upper limit of mechanical loading on the ribbon conductors is not exceeded by tension on an outermost ribbon conductor of the ribbon conductor stack and by compression of an innermost ribbon conductor of said ribbon stack when said optical cable is wrapped on a smallest foreseeable radius drum, owing to undulating guidance of the ribbon conductor stack the ribbon conductor stack forms a type of strip spring structure, and the ribbon conductors have lateral play with respect to a chamber wall such that turning up or down or cross-positioning of the ribbon conductors in said chamber is prevented.

2. An optical cable according to claim 1, wherein said ribbon conductor stack is of a total height of less than 50% of the height of the chamber.

3. An optical cable according to claim 1, wherein said ribbon conductors are of a width of between 60% and 90% of a width of the chamber.

4. An optical cable according to claim 1, wherein a ribbon conductor of said ribbon conductor stack lying on an outer run during winding is not stretched and is not under tension.

5. An optical cable according to claim 1, wherein a range of a most pronounced radius of curvature of the ribbon conductor lying on an inner run during winding does not drop below 60 mm.

6. An optical cable according to claim 1, wherein a ratio of height to width of the chamber is between 2:1 and 4:1.

7. An optical cable according to claim 1, wherein a periodic length of the undulatingly curved ribbon conductor stack is between 40 and 80 mm.

8. An optical cable according to claim 1, wherein said cable is an optical waveguide.

9. An optical cable according to claim 1, wherein said protective covering is of rectangular external cross section, and wherein a plurality of optical waveguides are arranged with their broad sides next to one another to form a cable core, an outer sheath surrounding said cable core.

10. An optical cable according to claim 1, wherein said optical waveguides are arranged displaceably with respect to one another.

11. An optical cable according to claim 1, further comprising: tensile elements arranged symmetrically with respect to a bending plane.

12. An optical cable according to claim 11, wherein tensile elements each bear against outer broad sides of the optical waveguides.

13. An optical cable as claimed in claim 7, wherein said periodic length is approximately 60 mm.

14. An optical cable as claimed in claim 11, wherein said tensile elements are in said bending plane.

* * * * *